United States Patent
Brashler et al.

(10) Patent No.: US 12,360,003 B2
(45) Date of Patent: Jul. 15, 2025

(54) PIPE STRAIN DETECTION AND DIAGNOSIS USING SENSORS FOR MACHINE CASING NOZZLES

(71) Applicant: Saudi Arabian Oil Company, Dhahran (SA)

(72) Inventors: Keith William Brashler, Dhahran (SA); Ali Al Shehri, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 277 days.

(21) Appl. No.: 17/984,807

(22) Filed: Nov. 10, 2022

(65) Prior Publication Data
US 2024/0159618 A1 May 16, 2024

(51) Int. Cl.
*G01M 5/00* (2006.01)
*F01D 21/00* (2006.01)
*F04D 27/00* (2006.01)

(52) U.S. Cl.
CPC ........ *G01M 5/0041* (2013.01); *G01M 5/0066* (2013.01); *F01D 21/003* (2013.01); *F04D 27/001* (2013.01)

(58) Field of Classification Search
CPC . G01M 5/0041; G01M 5/0066; F01D 21/003; F04D 27/001; F05D 2270/334; G01H 11/00; G01H 13/00; B82Y 40/00; E21B 47/13
See application file for complete search history.

(56) References Cited

U.S. PATENT DOCUMENTS

| | | | | |
|---|---|---|---|---|
| 11,795,960 B2* | 10/2023 | Brashler | ............... | F04D 29/043 |
| 11,828,160 B2* | 11/2023 | Al Shehri | ............... | F04D 13/10 |
| 12,060,888 B2* | 8/2024 | Brashler | ................. | F04D 7/065 |
| 2007/0068225 A1 | 3/2007 | Brown | | |
| 2010/0082275 A1* | 4/2010 | Borsting | ............. | F04D 15/0066 702/56 |

(Continued)

FOREIGN PATENT DOCUMENTS

| | | |
|---|---|---|
| EP | 3946982 A0 | 2/2022 |
| KR | 102418310 | 7/2022 |

OTHER PUBLICATIONS

U.S. Appl. No. 17/333,572, filed May 28, 2021, Brashler et al.
(Continued)

*Primary Examiner* — Timothy P Graves
(74) *Attorney, Agent, or Firm* — Fish & Richardson P.C.

(57) ABSTRACT

Example systems and methods for pipe strain detection and diagnosis using sensors for machine casing nozzles are disclosed. One example method includes introducing a rotating machine that includes a rotating element, a machine casing, an inlet nozzle, and an outlet nozzle, where the rotating element is configured to pump a fluid into the inlet nozzle through a first pipe and out of the outlet nozzle through a second pipe. A vibration sensor is attached to a nozzle flange connection of one of the inlet nozzle and the outlet nozzle, where the vibration sensor includes a substrate and a resonant layer disposed on a surface of the substrate, the resonant layer is configured to produce a resonant response in response to receiving a radio frequency signal while the fluid is being pumped. The resonant response is received by a radio frequency resonance detector in response to the radio frequency signal.

12 Claims, 6 Drawing Sheets

(56) References Cited

U.S. PATENT DOCUMENTS

2023/0021276 A1\* 1/2023 Stowell ................ B60C 1/0016
2024/0328887 A1\* 10/2024 Brashler ................ G01M 3/24
2024/0344630 A1 10/2024 Brashler et al.

OTHER PUBLICATIONS

U.S. Appl. No. 17/333,612, filed May 28, 2021, Al Shehri et al.
U.S. Appl. No. 17/333,597, filed May 28, 2021, Al Shehri et al.
Ibrahim et al., "Measurement of Pipe Strain Using an Ultrasonic System," International Journal of Current Science, Engineering & Technology, 2017, 6 pages.
Yasue et al., "Concrete pipe strain measurement using optical fiber sensor," IEICE Trans. Electron, 2000, E83-C(3), 7 pages.
SAIP Examination Report in Saudi Arabian Appln. No. 123450769, mailed on Nov. 2, 2024, 13 pages (with English Translation).

\* cited by examiner

PIPE STRAIN DETECTION AND DIAGNOSIS USING SENSORS FOR MACHINE CASING NOZZLES

TECHNICAL FIELD

This disclosure relates to condition detection and diagnosis of rotating machines.

BACKGROUND

Pipe strain on machine casing nozzles of rotating machines such as pumps, compressors, or steam turbine machines can be detrimental to machine reliability and can result in high maintenance costs, unplanned maintenance, or operation impacts due to unplanned downtime. The detrimental effects can include reduced mechanical seal and bearing life, machine rotating element seizures, or excessive vibration. Pipe strain can include vibration, stress, or strain of a pipe. These conditions can arise from machine casing distortion resulted from pipe strain. The pipe strain can result from piping misalignment, piping thermal growth, or a combination of the two. The pipe strain transmitted to the machine casing can result in both machine internal misalignment and shaft misalignment with drivers such as electric motor, steam turbine, diesel engine, or gas turbine.

SUMMARY

This disclosure involves systems and methods for condition detection and diagnosis of rotating machines. One example method includes introducing a rotating machine that includes a rotating element, a machine casing, an inlet nozzle, and an outlet nozzle, where the inlet nozzle and the outlet nozzle are disposed on the machine casing, the inlet nozzle is connected to a first pipe, the outlet nozzle is connected to a second pipe, and the rotating element is configured to pump a fluid into the inlet nozzle through the first pipe and out of the outlet nozzle through the second pipe. A vibration sensor is attached to a nozzle flange connection of one of the inlet nozzle and the outlet nozzle, where the vibration sensor includes a substrate and a resonant layer disposed on a surface of the substrate, the substrate includes a polymer, the resonant layer includes an electrically conductive nanomaterial and is configured to produce a resonant response in response to receiving a radio frequency signal. The fluid is pumped into the inlet nozzle through the first pipe and out of the outlet nozzle through the second pipe. The radio frequency signal is transmitted by a radio frequency interrogator and while the fluid is being pumped. The resonant response is received by a radio frequency resonance detector in response to the radio frequency signal, where the resonant response is produced by the resonant layer of the vibration sensor.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes condition detection and diagnosis of rotating machines, and more specifically, pipe strain detection and diagnosis using sensors for machine casing nozzles. A vibration sensor can be disposed at a suction or discharge nozzle flange connection of a nozzle of a rotating machine, such as a pump, a compressor, or a steam turbine machine. The nozzle can be connected to a pipe. The vibration sensor can include a responsive layer that produces a resonating response in response to a radio frequency (RF) signal. An RF resonance detector can detect the resonating response of the responsive patch. The resonating response of the responsive patch can be used with temperature measurement from a temperature sensor co-located with the vibration sensor to distinguish between pipe flange misalignment, thermal growth induced strain in the pipe, or a combination of the two.

The subject matter described in this disclosure can be implemented in particular implementations, so as to realize one or more of the following advantages. The vibration sensor can be implemented at a nozzle flange connection of a suction or discharge nozzle of a rotating machine that has inlet and outlet nozzles, in order to detect pipe strain transmitted through the pipe and the nozzle to the machine casing. Early detection of pipe strain and its detrimental effects on machine reliability can significantly reduce maintenance costs, increase availability of equipment, and allow for proper scheduling and maintenance planning efforts. The vibration sensor includes nanoscale materials that interact with RF techniques, which can enhance sensitivity of vibration sensing and can also allow for low-temperature sintering fabrication on stretchable polymer substrates. Temperature measurement from a temperature sensor co-located with the vibration sensor can be used together with measurement from the vibration sensor to identify and distinguish between piping misalignment or from thermal expansion for machines with elevated operating temperatures.

Figure 1A:
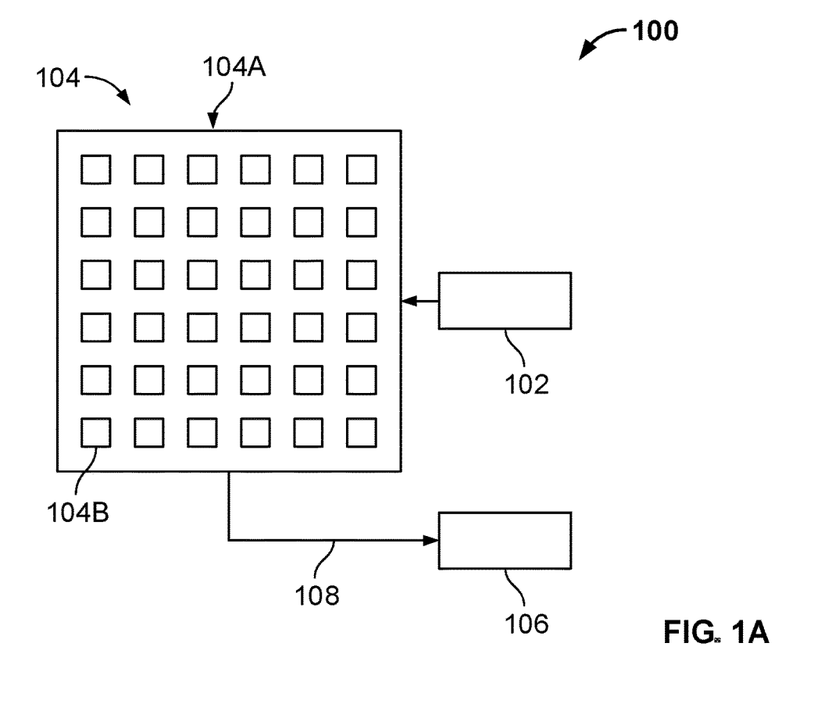
FIG. 1A is a schematic diagram of an example vibration sensor.

Referring to FIG. 1A, vibration sensor 100 includes an RF interrogator 102, a responsive patch 104, an RF resonance detector 106, and a transmission line 108. The responsive patch 104 includes a substrate 104a and a resonant layer 104b. The resonant layer 104b is disposed on a surface of the substrate 104a. The transmission line 108 couples the responsive patch 104 to the RF resonance detector 106.

The RF interrogator 102 is configured to produce an electromagnetic interrogation pulse having a first frequency. The first frequency can be in a range of from about 300 megahertz (MHZ) to about 1,000 gigahertz (gHz), from about 300 MHz to about 500 GHz, from about 300 MHz to about 300 GHz, from about 300 MHz to about 100 GHz, or from about 1 GHz to about 60 GHz.

The responsive patch 104 includes a nanoscale polymer composite material. For example, the responsive patch 104 includes a composite material that includes a polymer and a nanomaterial. In some implementations, the substrate 104a includes a solid metal. For example, the substrate 104a includes solid copper. In some implementations, the substrate 104a includes a stretchable polymer. For example, the substrate 104a includes a silicone, such as polydimethylsiloxane (PDMS). The resonant layer 104b includes an electrically conductive nanomaterial and is configured to resonate at the first frequency in response to receiving the electromagnetic interrogation pulse from the RF interrogator 102. For example, the shape and/or dimensions of the resonant layer 104b including the electrically conductive nanomaterial can be adjusted, such that the resonant layer 104b resonates at the first frequency. In some implementations, a thickness of the resonant layer 104b varies along a first dimension, a length of the resonant layer 104b varies along a second dimension, a width of the resonant layer 104b varies along a third dimension, or any combination of these. In some implementations, the electrically conductive nanomaterial includes carbon nanotubes (CNT), silver nanoparticles, or a combination of these. The CNT, silver nanoparticles, or both can be disposed on the substrate 104a (for example, the stretchable polymer substrate). In some implementations, the electrically conductive nanomaterial is disposed in an electrically insulating matrix (for example, made of poly(methyl methacrylate) (PMMA)), which is disposed on the substrate 104a made of a stretchable polymer (for example, PDMS).

Figure 1B:
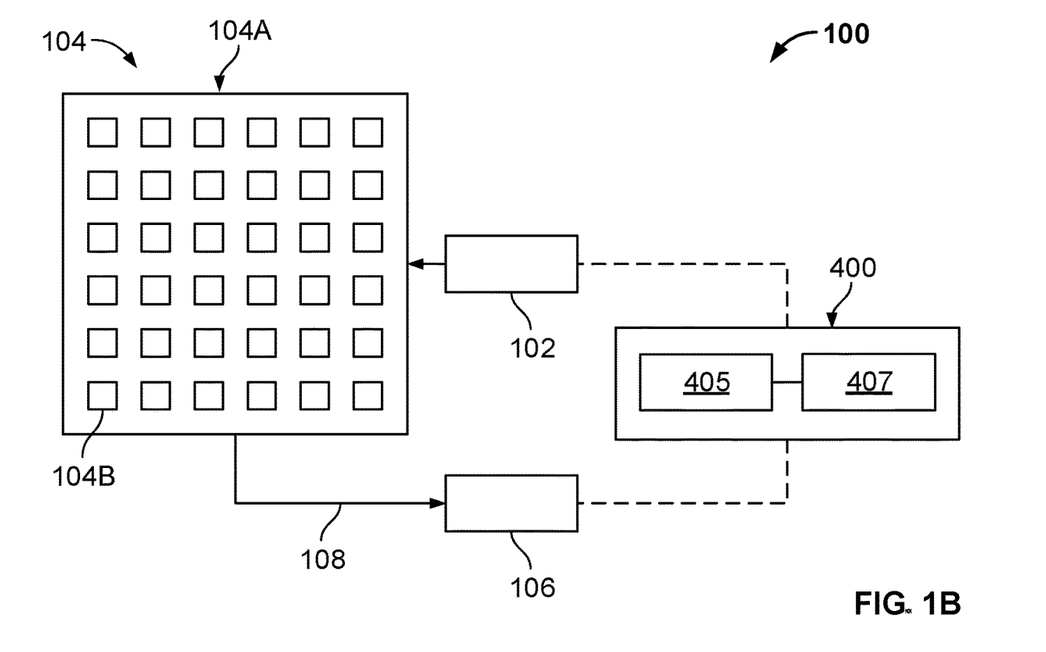
FIG. 1B is a schematic diagram of the vibration sensor of FIG. 1A, including a computer system.

In some implementations, as shown in FIGS. 1A and 1B, the resonant layer 104b is disposed on the substrate 104a in the form of an array of discrete portions of the electrically conductive nanomaterial disposed on a surface of the substrate 104a. In some implementations, the resonant layer 104b is configured to resonate at various frequencies, for example, such that the vibration sensor 100 can sense vibrations of different components of an operating rotating machine. In some implementations, the resonant layer 104b is disposed on the substrate 104a by a photolithography technique, ion etching, sputter deposition, inkjet printing, or screen printing.

The transmission line 108 is configured to transmit a resonating response of the responsive patch 104 to the RF resonance detector 106. The RF resonance detector 106 is configured to detect the resonating response of the responsive patch 104 transmitted by the transmission line 108. In some implementations, the RF interrogator 102 and the RF resonance detector 106 are parts of an RF network analyzer, which can be a scalar or vector type analyzer. In such implementations, the RF network analyzer both produces the electromagnetic interrogation pulse and detects the resonating response of the responsive patch 104. The RF network analyzer can excite, via the RF interrogator 102, the responsive patch 104 with the electromagnetic interrogation pulse (RF signal) propagating at a frequency of interest (for example, 2.4 GHz), and then the resonating response of the responsive patch 104 is detected by the RF network analyzer via the RF resonance detector 106. The resonating response of the responsive patch 104 will exhibit a phase, amplitude, and resonance shift in comparison to the original interrogation pulse based on the composition and dimensions of the responsive patch 104. The RF resonance detector 106 can detect the phase, amplitude, and resonance shifts and can measure scattering parameters (S-parameters) of the resonating response of the responsive patch 104, such as return loss. The measured return loss can be correlated to vibration behavior. In some implementations, the RF interrogator 102 and the RF resonance detector 106 are connected to the responsive patch 104 by SubMiniature version A (SMA) connectors.

Figure 4:
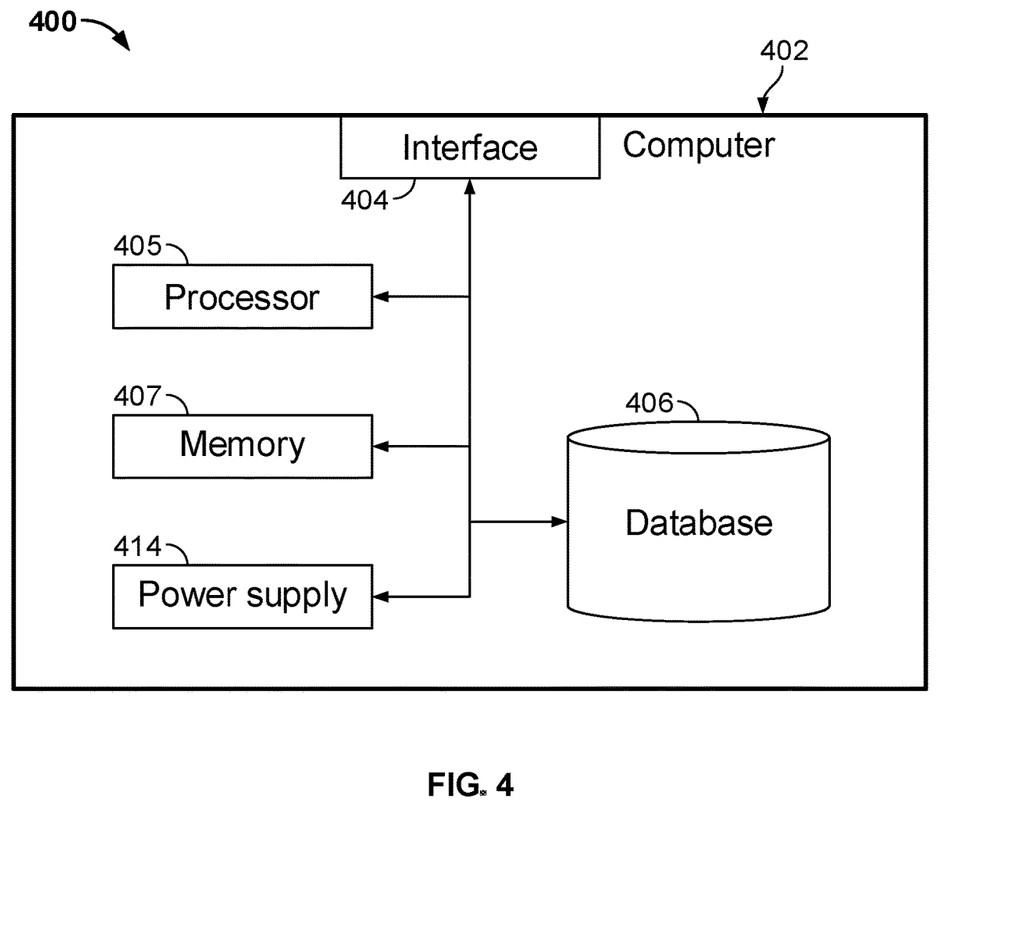
FIG. 4 is a block diagram of an example computer system that can be included in the vibration sensor of FIG. 1A.

In some implementations, as shown in FIG. 1B, the vibration sensor 100 includes a computer system 400. The computer system 400 can be communicatively coupled to the RF resonance detector 106. The computer system 400 includes a processor 405 and a memory 407. The memory is coupled to the processor 405 and stores programming instructions for execution by the processor 405. The programming instructions instruct the processor 405 to perform various operations. An example of the computer system 400 is also shown in FIG. 4 and described in more detail later. The operations can include receiving the resonating response from the RF resonance detector 106. The operations can include processing the resonating response to determine a vibrational strain (that is, strain caused by vibration) of the resonant layer 104b. The operations can include comparing the determined vibrational strain with various vibrational strain signatures to determine whether the determined vibrational strain matches any of the vibrational strain signatures. The resonating response can be analyzed by the processor 405 by correlating a mechanical change to an electrical length change of the resonant layer 104b and then correlating the electrical length change to a resonance shift signature (vibrational strain signature). Electrical length is related to the resonance frequency of the resonant layer 104b. For example, a resonant layer 104b with a physical length of five centimeters can resonate at a frequency of 2.4 GHz.

Some examples of vibrational strain signatures that can be stored in the memory 407 and be compared with the determined vibrational strain include a vibrational strain signature attributed to rotating machine cavitation, a vibrational strain signature attributed to rotor imbalance, a vibrational strain signature attributed to mechanical wear of bushing(s) (such as line shaft bushings), a vibrational strain signature attributed to mechanical wear of bearing(s) (such as bottom bearings), a vibrational strain signature attributed to rubbing between adjacent rotating machine components, and a vibrational strain signature attributed to vertical rotating machine column/mechanical resonance. The operations can include transmitting a warning message (for example, to an operator control screen) in response to determining that the determined vibrational strain of the resonant layer 104b matches any of the vibrational strain signatures. An operator can then mitigate or eliminate the cause of the vibrational strain, which can, for example, extend the life of operating equipment and/or prevent the need for unplanned maintenance activities which can be costly and time-intensive.

A resonant structure can be described as an equivalent circuit of lumped inductors (L) and capacitors (C). In the case of a conductor, if there is a material within the conductor that causes additional capacitance, its presence will effectively increase an electrical length of the conductor, and the resonance of the conductor will decrease. In relation to the vibration sensor 100, vibrational strain conditions can impose additional capacitance and/or affect molecular interactions in the responsive patch 104, which can slow down the RF waveform and effectively increase the electrical length of the resonating structure (responsive patch 104). For example, a resonant structure with an electrical length of $\lambda/2$ will exhibit resonance at a frequency which makes the electrical length of the line half of its wavelength. As velocity of propagation along the line decreases (meaning the wavelength along the line decreases at a given frequency), then the resonant frequency decreases. The proportional decrease in resonant frequency will be equal to the proportional decrease in velocity of propagation.

In some implementations, the computer system 400 is communicatively coupled to the RF interrogator 102. For example, the computer system 400 can be connected to the RF interrogator 102 by a wired connection or a wireless connection. In such implementations, the operations performed by the processor 405 can include causing the RF interrogator 102 to produce the electromagnetic interrogation pulse having the first frequency.

Figure 2:
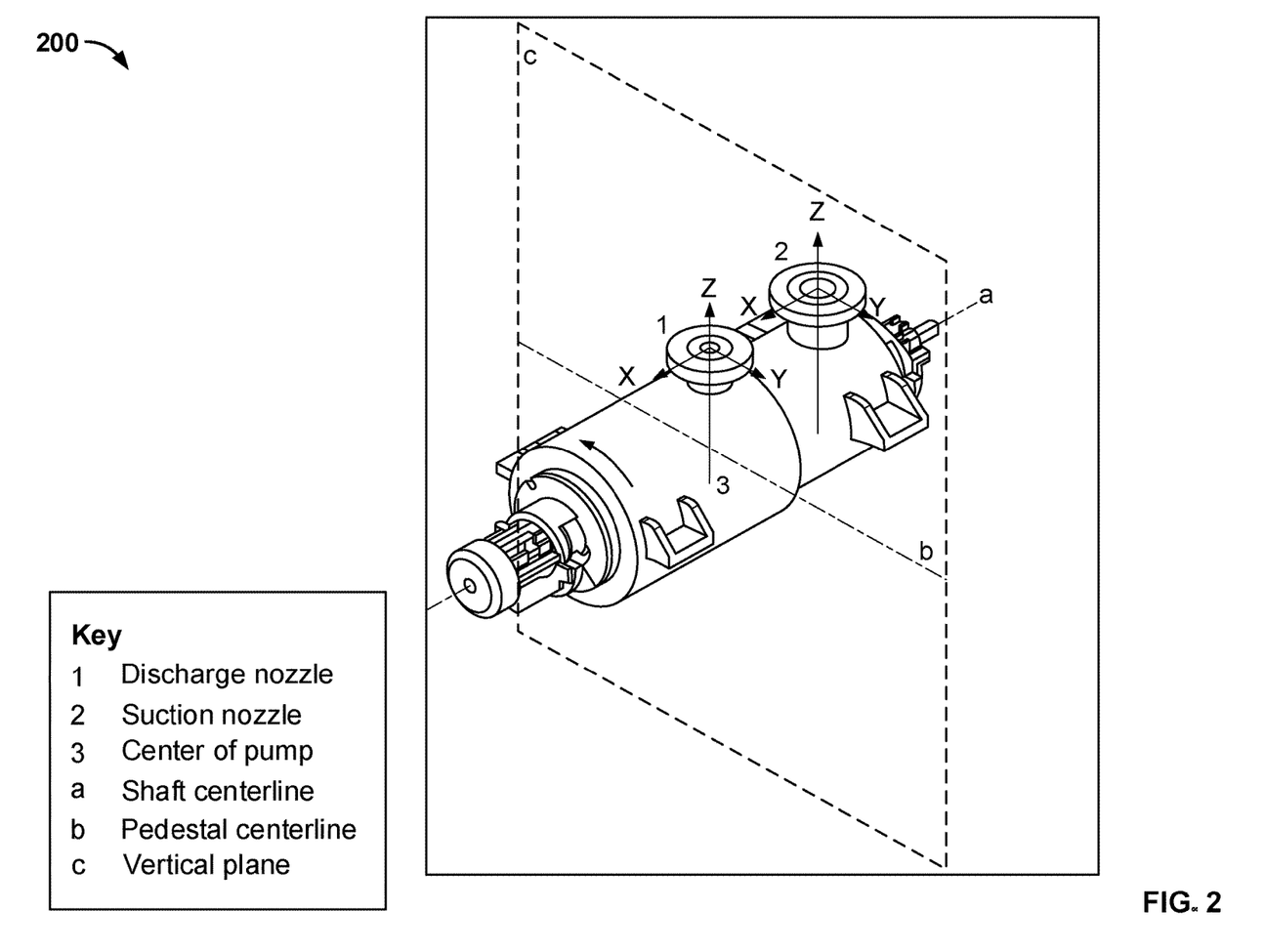
FIG. 2 is a schematic drawing of an example rotating machine with nozzles that include the vibration sensor and computer system of FIG. 1B.

FIG. 2 is a schematic drawing of an example rotating machine with nozzles in accordance with an embodiment of the present disclosure, including the vibration sensor 100 and computer system 400 of FIG. 1B. FIG. 2 illustrates a coordinate system for forces and moments horizontal rotating machine top discharge nozzle 1 and top suction nozzle 2. Referring to FIG. 2, the vibration sensor 100 and a temperature sensor can be co-located at the machine nozzle flange connection of top discharge nozzle 1 or top suction nozzle 2. Both the vibration sensor 100 and the temperature sensor can be encapsulated with intrinsically safe hermetic material and attached to top discharge nozzle 1 or top suction nozzle 2 using the encapsulation materials with additional layer of adhesives. The vibration sensor 100 can be added to the nozzle locations prior to piping attachment to the nozzles. In some implementations, two vibration sensors can be positioned in two orthogonal planes of a nozzle respectively to sense vibration in each plane separately.

Figure 3:
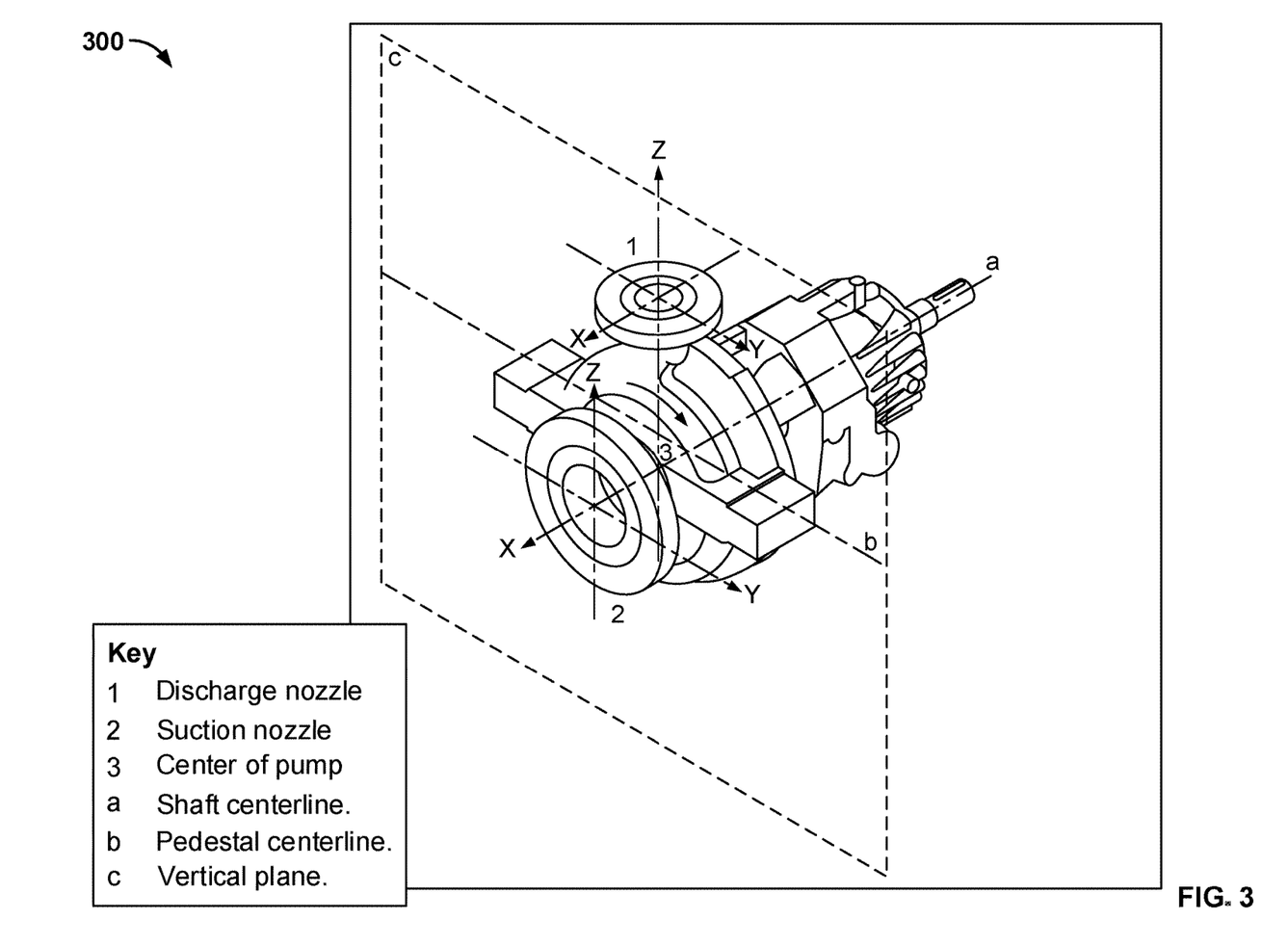
FIG. 3 is a schematic drawing of another example rotating machine with nozzles that include the vibration sensor and computer system of FIG. 1B.

FIG. 3 is a schematic drawing of another example rotating machine with nozzles in accordance with an embodiment of the present disclosure, including the vibration sensor 100 and computer system 400 of FIG. 1B. FIG. 3 illustrates a coordinate system for forces and moments horizontal rotating machine top discharge nozzle 1 and end suction nozzle 2. Referring to FIG. 3, the vibration sensor 100 and a temperature sensor can be co-located at the machine nozzle flange connection of top discharge nozzle 1 or end suction nozzle 2. In some implementations, two vibration sensors can be positioned in two orthogonal planes of a nozzle respectively to sense vibration in each plane separately. The rotating machine illustrated in FIG. 3 can be a portable device that can be applied on different machines and during troubleshooting efforts. The rotating machine can be either a permanently mounted device or a portable device that can be used temporarily for start-up and troubleshooting efforts.

In some implementations, the temperature sensor co-located with the vibration sensor 100 can provide additional data to identify if thermal expansion is a contributing factor or a main cause of the pipe strain detected by the vibration sensor 100. More specifically, pipe strain induced at ambient temperature conditions can indicate piping flange misalignment. Pipe strain induced as temperature is increased from ambient to operating temperature can indicate that the pipe strain is induced from thermal growth of the piping system. Having the baseline data at ambient temperature can distinguish between pipe flange misalignment, thermal growth induced pipe strain, or a combination of the two. Piping flange misalignment can be measured initially. A machine learning algorithm can be used to distinguish data spectra and interpretation of data in different scenarios.

In some implementations, the vibration sensor 100 and the temperature sensor can be encapsulated, for example, using encapsulation materials with additional layer of adhesives, in the nozzles illustrated in FIGS. 2 and 3 to achieve the target of intrinsically hermetically safe sensing components. Epoxies such as aluminum oxide (nonfibrous form) can be based on the chemical resistance properties to fluid in a pipe connected to the nozzle and the ability to sustain high temperatures, for example, above 200° C. Additionally, commercial epoxy resin such as (bisphenol A diglycidyl ether) can be used as encapsulation materials.

In some implementations, the vibration sensor 100 and the temperature sensor can be protected from high temperature environments by the provision of a matrix. This protection can enhance the applicability of the vibration sensor 100 and the temperature sensor to a wider range of applications. Example applications with elevated operating temperatures where thermal expansion induced pipe strain can occur include boiler feedwater services, refinery hot oil pumps, or steam turbine inlet and outlet piping. Example operating temperature range can be from ambient to 300-400 F for boiler feedwater services and up to 700 F for refinery hot oil pumps.

In some implementations, a microelectromechanical system (MEMS) piezoelectric sensor can be used in lieu of the vibration sensor 100. The MEMS piezoelectric sensor can be fabricated using lithography techniques where ground electrode deposition with a Piezoelectric (AlN) layer and Au top electrode deposition etched on Si layer can be used to get proof mass and specific diaphragm thickness. The electrodes can be in nano meter range ranging between 50-100 nm.

In some implementations, off-shelf accelerometers can be used in conjunction with temperature sensors to detect the strain and temperature variations at the nozzles illustrated in FIGS. 2 and 3.

FIG. 4 is a block diagram of the computer system 400 used to provide computational functionalities associated with described algorithms, methods, functions, processes, flows, and procedures, as described in this specification, according to an implementation. As mentioned previously, the vibration sensor 100 can include the computer system 400. The illustrated computer 402 is intended to encompass any computing device, such as a server, desktop computer, laptop/notebook computer, one or more processors within these devices, or any other processing device, including physical or virtual instances (or both) of the computing device. Additionally, the computer 402 can include a computer that includes an input device, such as a keypad, keyboard, touch screen, or other device that can accept user information, and an output device that conveys information associated with the operation of the computer 402, including digital data, visual, audio information, or a combination of information.

The computer 402 includes an interface 404. Although illustrated as a single interface 404 in FIG. 4, two or more interfaces 404 may be used according to particular needs, desires, or particular implementations of the computer 402. Although not shown in FIG. 4, the computer 402 can be communicably coupled with a network. The interface 404 is used by the computer 402 for communicating with other systems that are connected to the network in a distributed environment. Generally, the interface 404 comprises logic encoded in software or hardware (or a combination of software and hardware) and is operable to communicate with the network. More specifically, the interface 404 may comprise software supporting one or more communication protocols associated with communications, such that the network or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in this specification.

The computer 402 can also include a database 406 that can hold data for the computer 402 or other components (or a combination of both) that can be connected to the network. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, database 406 can be external to the computer 402.

The computer 402 also includes a memory 407 that can hold data for the computer 402 or other components (or a combination of both) that can be connected to the network. The memory 407 is a computer-readable storage medium. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, memory 407 can be external to the computer 402. The memory 407 can be a transitory or non-transitory storage medium.

The memory 407 stores computer-readable instructions executable by the processor 405 that, when executed, cause the processor 405 to perform operations, such as any of the steps of method 300B. The computer 402 can also include a power supply 414. The power supply 414 can include a rechargeable or non-rechargeable battery that can be configured to be either user- or non-user-replaceable. The power supply 414 can be hard-wired. There may be any number of computers 402 associated with, or external to, a computer system containing computer 402, each computer 402 communicating over the network. Further, the term "client," "user," "operator," and other appropriate terminology may be used interchangeably, as appropriate, without departing from this specification. Moreover, this specification contemplates that many users may use one computer 402, or that one user may use multiple computers 402.

Figure 5:
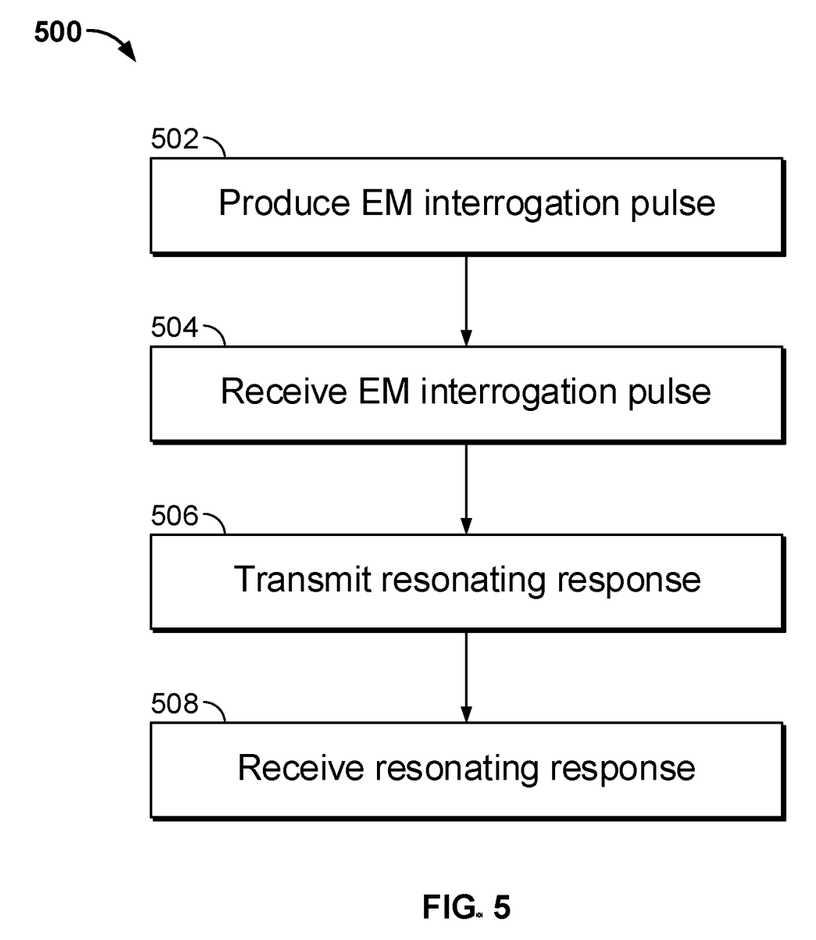
FIG. 5 is a flow chart of an example method for using the vibration sensor of FIG. 1A.

FIG. 5 is a flow chart of a method 500 that can be implemented to sense vibrations in operating equipment, for example, the nozzles illustrated in FIGS. 2 and 3. For example, method 500 can be implemented by the vibration sensor 100. At step 502, an electromagnetic interrogation pulse having a first frequency is produced by an RF interrogator (such as the RF interrogator 102).

At step 504, the electromagnetic interrogation pulse from the RF interrogator 102 is received by a resonant payer of a responsive patch (such as the resonant layer 104b of the responsive patch 104). The resonant layer 104b resonates at the first frequency in response to receiving the electromagnetic interrogation pulse at step 504.

At step 506, a resonating response of the responsive patch 104 is transmitted by a transmission line (such as the transmission line 108) that couples the responsive patch to an RF resonance detector (such as the RF resonance detector 106). The resonating response of the responsive patch 104 is transmitted by the transmission line 108 to the RF resonance detector 106 at step 506.

At step 508, the resonating response of the responsive patch 104 is received (detected) by the RF resonance detector 106.

Figure 6:
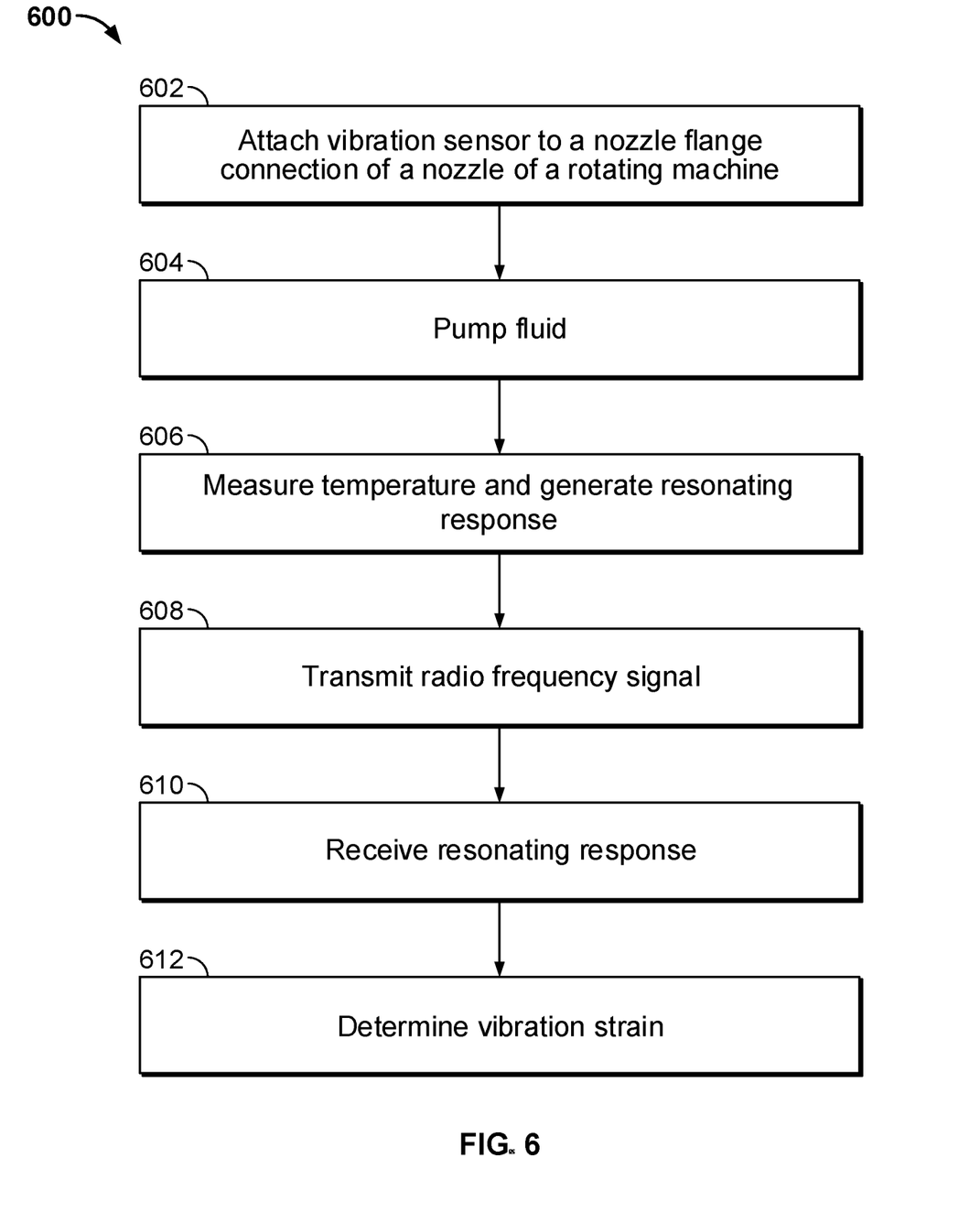
FIG. 6 is a flow chart of an example method for determining pipe strain of rotating machines.

FIG. 6 is a flow chart of a method 600 for determining pipe strain of rotating machines. In some implementations, method 500 includes an implementation of method 600. For example, method 500 can include any of the steps of method 600.

Referring to FIG. 6, at step 602 of method 600, vibration sensor 100 is attached to a nozzle flange connection of a nozzle of a rotating machine illustrated in FIGS. 2 and 3. At step 604, fluid is pumped through a pipe connected to the nozzle. At step 606, the temperature of the nozzle is measured by a temperature sensor and a resonating response of the responsive patch 104 is generated by vibration sensor 100. The temperature sensor can be a thermocouple or a resistance temperature detector (RTD).

At step 608, as described in more detail with respect to FIGS. 1A and 1B, the resonating response of the responsive patch 104 is transmitted by a transmission line (such as the transmission line 108) that couples the responsive layer to an RF resonance detector (such as the RF resonance detector 106).

At step 610, as described in more detail with respect to FIGS. 1A and 1B, the resonating response from the RF resonance detector 106 is received by one or more processors (such as the processor 405). At step 612, as described in more detail with respect to FIGS. 1A and 1B, the resonating response is processed by the processor 405 to determine a vibrational strain of the resonant layer 104b.

In some implementations, machine learning operations can be performed to analyze measurement data from the vibration sensor 100 and the temperature sensor. The output of the vibration sensor 100 and the temperature sensor can be collected in real time through electrical connects to a computer where the machine learning code is executed. Sensing data can be fed into the machine learning algorithm that is previously trained on similar sensing data examples and events that are used as part of training data set. The machine learning algorithm can produce an output correlating the measurement with type of strain or thermal effect.

Certain aspects of the subject matter described here can be implemented as a system. The system includes a rotating machine and a vibration sensor. The rotating machine includes a rotating element, a machine casing, an inlet nozzle, and an outlet nozzle, where the inlet nozzle and the outlet nozzle are disposed on the machine casing, the inlet nozzle is connected to a first pipe, the outlet nozzle is connected to a second pipe, and the rotating element is configured to pump a fluid into the inlet nozzle through the first pipe and out of the outlet nozzle through the second pipe. The vibration sensor is disposed on a nozzle flange connection of one of the inlet nozzle and the outlet nozzle, where the vibration sensor includes a substrate and a resonant layer disposed on a surface of the substrate, the substrate includes a polymer, the resonant layer includes an electrically conductive nanomaterial and is configured to produce a resonant response in response to receiving a radio frequency signal.

Systems can include one or more of the following features.

In some implementations, the system further includes a computer system that includes one or more processors and a non-transitory computer readable medium storing instructions executable by the one or more processors to perform computer system operations that include receiving, by the computer system, the resonant response, and processing, by the computer system, the resonant response to determine a vibrational strain of the resonant layer.

In some implementations, the system further includes a temperature sensor disposed on the nozzle flange connection of one of the inlet nozzle and the outlet nozzle.

In some implementations, the computer system operations further include receiving temperature data from the temperature sensor while pumping the fluid.

In some implementations, the computer system operations further include identifying, using the temperature data and a current vibrational strain of the resonant layer, one or more pipe strain conditions, where the one or more pipe strain conditions includes at least one of a piping misalignment, a piping thermal growth, or a combination of the piping misalignment and the piping thermal growth.

In some implementations, the rotating machine includes one of a pump, a compressor, and a steam turbine machine.

In some implementations, the fluid is a hydrocarbon fluid.

In some implementations, the vibration sensor is encapsulated on the nozzle flange connection of one of the inlet nozzle and the outlet nozzle.

In some implementations, the vibration sensor is positioned in a first plane of the nozzle flange connection of one of the inlet nozzle and the outlet nozzle.

In some implementations, the resonant response further includes a second resonant response from a second vibration sensor, where the second vibration sensor is disposed on the nozzle flange connection of one of the inlet nozzle and the outlet nozzle, the second vibration sensor is positioned in a second plane of the nozzle flange connection of one of the inlet nozzle and the outlet nozzle, and the second plane is orthogonal to the first plane.

Certain aspects of the subject matter described here can be implemented as a method. A rotating machine that includes a rotating element, a machine casing, an inlet nozzle, and an outlet nozzle is introduced, where the inlet nozzle and the outlet nozzle are disposed on the machine casing, the inlet nozzle is connected to a first pipe, the outlet nozzle is connected to a second pipe, and the rotating element is configured to pump a fluid into the inlet nozzle through the first pipe and out of the outlet nozzle through the second pipe. A vibration sensor is attached to a nozzle flange connection of one of the inlet nozzle and the outlet nozzle, where the vibration sensor includes a substrate and a resonant layer disposed on a surface of the substrate, the substrate includes a polymer, the resonant layer includes an electrically conductive nanomaterial and is configured to produce a resonant response in response to receiving a radio frequency signal. The fluid is pumped into the inlet nozzle through the first pipe and out of the outlet nozzle through the second pipe. The radio frequency signal is transmitted by a radio frequency interrogator and while the fluid is being pumped. The resonant response is received by a radio frequency resonance detector in response to the radio frequency signal, where the resonant response is produced by the resonant layer of the vibration sensor.

Methods can include one or more of the following features.

In some implementations, the radio frequency interrogator and the radio frequency resonance detector are communicatively coupled to a computer system that includes one or more processors and a non-transitory computer readable medium storing instructions executable by the one or more processors to perform computer system operations that include receiving, by the computer system, the resonant response, and processing, by the computer system, the resonant response to determine a vibrational strain of the resonant layer.

In some implementations, the method further includes attaching a temperature sensor to the nozzle flange connection of one of the inlet nozzle and the outlet nozzle.

In some implementations, the computer system operations further include receiving temperature data from the temperature sensor while pumping the fluid.

In some implementations, the computer system operations further include identifying, using the temperature data and a current vibrational strain of the resonant layer, one or more pipe strain conditions, where the one or more pipe strain conditions includes at least one of a piping misalignment, a piping thermal growth, or a combination of the piping misalignment and the piping thermal growth.

In some implementations, the rotating machine includes one of a pump, a compressor, and a steam turbine machine.

In some implementations, the fluid is a hydrocarbon fluid.

In some implementations, the vibration sensor is encapsulated on the nozzle flange connection of one of the inlet nozzle and the outlet nozzle.

In some implementations, the vibration sensor is positioned in a first plane of the nozzle flange connection of one of the inlet nozzle and the outlet nozzle.

In some implementations, the resonant response further includes a second resonant response from a second vibration sensor, where the second vibration sensor is disposed on the nozzle flange connection of one of the inlet nozzle and the outlet nozzle, the second vibration sensor is positioned in a second plane of the nozzle flange connection of one of the inlet nozzle and the outlet nozzle, and the second plane is orthogonal to the first plane.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "nanoscale" refers to a scale on the order of 1 micrometer (1000 nanometers) or less. For example, nanoscale includes sizes ranging from 1 nanometer up to 1000 nanometers. The term "nanomaterial"

refers to a material with a dimension (for example, a maximum or average dimension) in a range of from 1 nanometer to 1000 nanometers. Further, the term "nanoparticle" refers to a particle with a dimension (for example, a maximum or average dimension) in a range of from 1 nanometer to 1000 nanometers. A dimension can be, for example, diameter, length, width, height, or thickness.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
    a rotating machine comprising a rotating element, a machine casing, an inlet nozzle, and an outlet nozzle, wherein the inlet nozzle and the outlet nozzle are disposed on the machine casing, the inlet nozzle is connected to a first pipe, the outlet nozzle is connected to a second pipe, and the rotating element is configured to pump a fluid into the inlet nozzle through the first pipe and out of the outlet nozzle through the second pipe;
    a vibration sensor disposed on a nozzle flange connection of one of the inlet nozzle and the outlet nozzle, wherein the vibration sensor comprises:
        a substrate comprising a polymer; and
        a resonant layer disposed on a surface of the substrate, the resonant layer comprising an electrically conductive nanomaterial and configured to produce a resonant response in response to receiving a radio frequency signal;
    a temperature sensor disposed on the nozzle flange connection of one of the inlet nozzle and the outlet nozzle; and
    a computer system, comprising:
        one or more processors; and
        a non-transitory computer readable medium storing instructions executable by the one or more processors to perform computer system operations comprising:
            receiving the resonant response;
            receiving temperature data from the temperature sensor;
            processing the resonant response to determine a current vibrational strain of the resonant layer; and
            identifying, using the temperature data and the current vibrational strain of the resonant layer, one or more pipe strain conditions, wherein the one or more pipe strain conditions comprises at least one of a piping misalignment, a piping thermal growth, or a combination of the piping misalignment and the piping thermal growth.

2. The system of claim 1 wherein the rotating machine comprises one of a pump, a compressor, and a steam turbine machine.

3. The system of claim 1, wherein the fluid is a hydrocarbon fluid.

4. The system of claim 1, wherein the vibration sensor is encapsulated on the nozzle flange connection of one of the inlet nozzle and the outlet nozzle.

5. The system of claim 1, wherein the vibration sensor is positioned in a first plane of the nozzle flange connection of one of the inlet nozzle and the outlet nozzle.

6. The system of claim 5, wherein the resonant response further comprises a second resonant response from a second vibration sensor, where the second vibration sensor is disposed on the nozzle flange connection of one of the inlet nozzle and the outlet nozzle, the second vibration sensor is positioned in a second plane of the nozzle flange connection of one of the inlet nozzle and the outlet nozzle, and the second plane is orthogonal to the first plane.

7. A method comprising:
    introducing a rotating machine comprising a rotating element, a machine casing, an inlet nozzle, and an outlet nozzle, wherein the inlet nozzle and the outlet nozzle are disposed on the machine casing, the inlet nozzle is connected to a first pipe, the outlet nozzle is connected to a second pipe, and the rotating element is configured to pump a fluid into the inlet nozzle through the first pipe and out of the outlet nozzle through the second pipe;
    attaching a vibration sensor to a nozzle flange connection of one of the inlet nozzle and the outlet nozzle, wherein the vibration sensor comprises:
        a substrate comprising a polymer; and
        a resonant layer disposed on a surface of the substrate, the resonant layer comprising an electrically conductive nanomaterial and configured to produce a resonant response in response to receiving a radio frequency signal;
    attaching a temperature sensor to the nozzle flange connection of one of the inlet nozzle and the outlet nozzle;

pumping the fluid into the inlet nozzle through the first pipe and out of the outlet nozzle through the second pipe;

transmitting, by a radio frequency interrogator and while pumping the fluid, the radio frequency signal; and receiving, by a radio frequency resonance detector, the resonant response in response to the radio frequency signal, the resonant response produced by the resonant layer of the vibration sensor, wherein the radio frequency interrogator and the radio frequency resonance detector are communicatively coupled to a computer system comprising:

one or more processors; and a non-transitory computer readable medium storing instructions executable by the one or more processors to perform computer system operations comprising:

receiving, by the computer system, the resonant response;

receiving temperature data from the temperature sensor while pumping the fluid;

processing, by the computer system, the resonant response to determine a current vibrational strain of the resonant layer; and identifying, using the temperature data and the current vibrational strain of the resonant layer, one or more pipe strain conditions, wherein the one or more pipe strain conditions comprises at least one of a piping misalignment, a piping thermal growth, or a combination of the piping misalignment and the piping thermal growth.

8. The method of claim 7, wherein the rotating machine comprises one of a pump, a compressor, and a steam turbine machine.

9. The method of claim 7, wherein the fluid is a hydrocarbon fluid.

10. The method of claim 7, wherein the vibration sensor is encapsulated on the nozzle flange connection of one of the inlet nozzle and the outlet nozzle.

11. The method of claim 7, wherein the vibration sensor is positioned in a first plane of the nozzle flange connection of one of the inlet nozzle and the outlet nozzle.

12. The method of claim 11, wherein the resonant response further comprises a second resonant response from a second vibration sensor, where the second vibration sensor is disposed on the nozzle flange connection of one of the inlet nozzle and the outlet nozzle, the second vibration sensor is positioned in a second plane of the nozzle flange connection of one of the inlet nozzle and the outlet nozzle, and the second plane is orthogonal to the first plane.

* * * * *